June 30, 1964      E. A. STEINBOCK, JR      3,139,270
POWER MIXER
Filed Oct. 13, 1960      3 Sheets-Sheet 1

INVENTOR.
EDMUND A. STEINBOCK, JR.
BY
Joseph A. Rave
Attorney

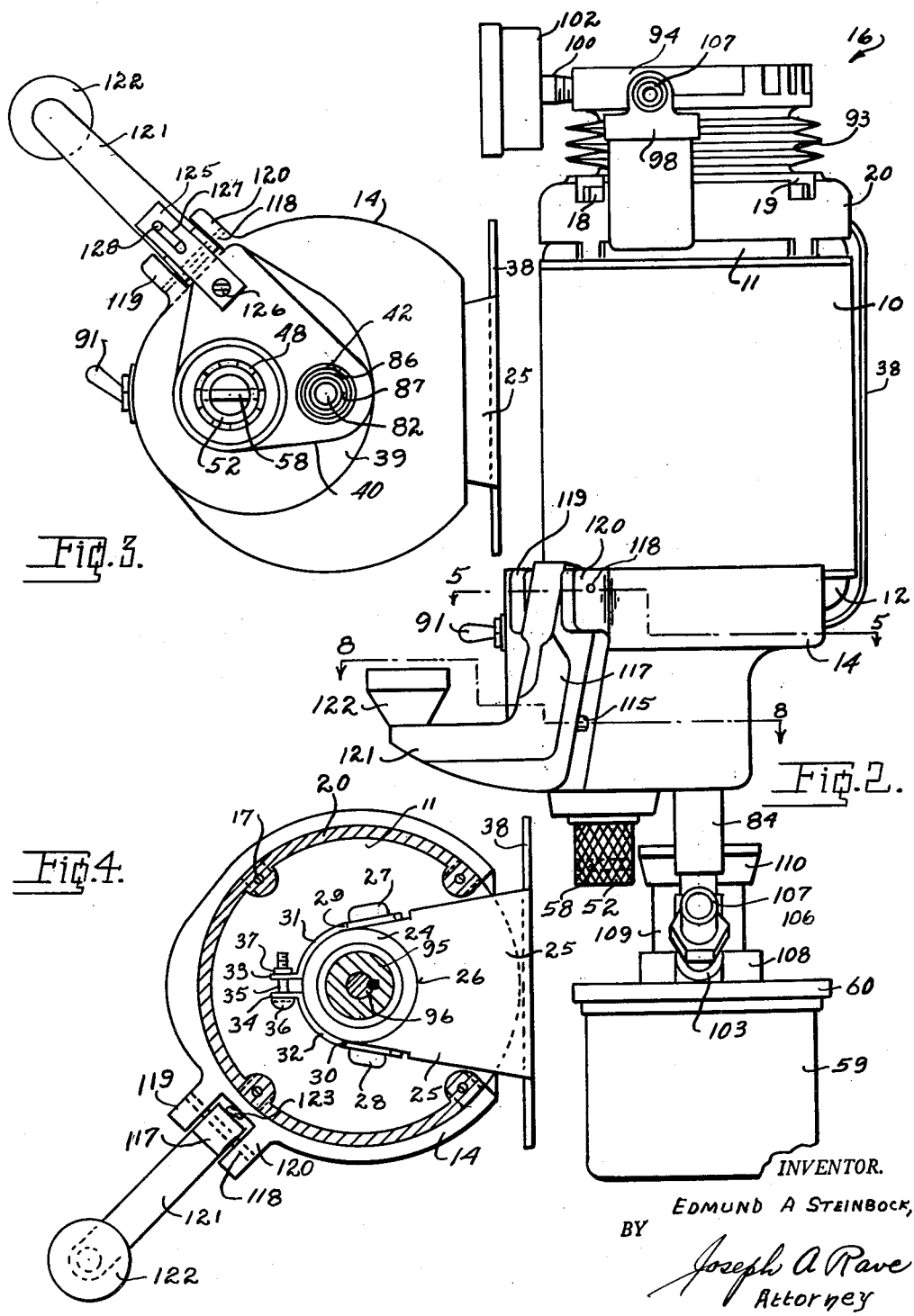

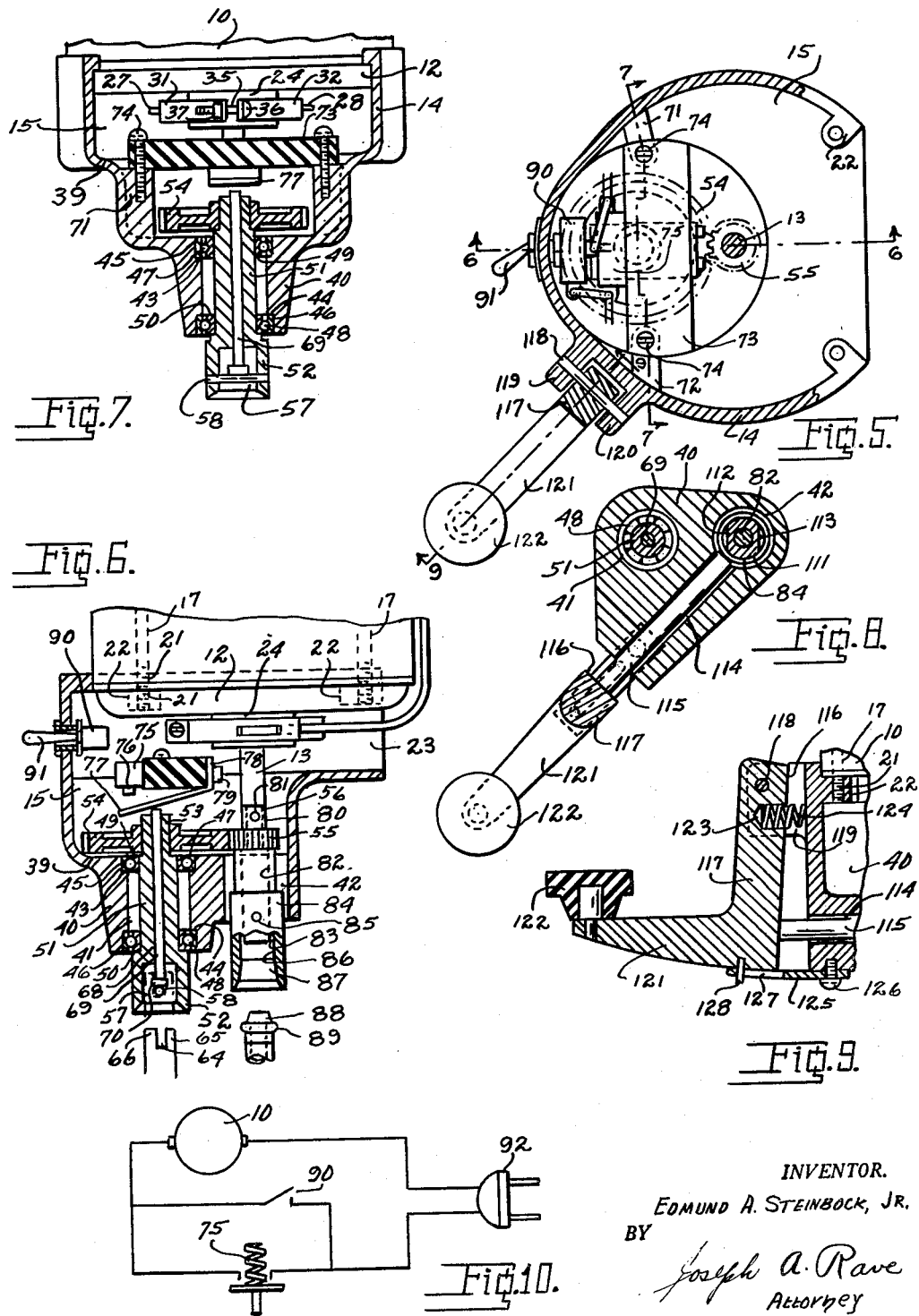

United States Patent Office 3,139,270
Patented June 30, 1964

1

3,139,270
POWER MIXER
Edmund A. Steinbock, Jr., Louisville, Ky., assignor to Whip-Mix Corporation, Louisville, Ky., a corporation of Kentucky
Filed Oct. 13, 1960, Ser. No. 62,215
6 Claims. (Cl. 259—108)

This invention relates to improvements in a power mixer, that is, a power driven mixing blade for thoroughly mixing materials, such as cementitious materials for making models and molds.

This invention relates to and discloses improvements over that disclosed in pending application of Edmund A. Steinbock, Jr., Serial No. 852,093, filed November 10, 1959 for Power Mixer.

In the formation of casting molds, models, that is, reproductions in artificial stone and refractory material, and the like, use is made of materials in powdered form and mixed with a liquid to provide a flowable mass prior to the formation of said mold, model, or the like. These powdered materials are provided with addition dry chemicals whereby their setting expansion or contraction is effected or controlled and the thermal expansion of said powdered materials is likewise controlled.

In the mixing of the powdered materials and the liquid certain of them must be mixed at slower speeds than others in order that the resulting flowable material does not lose working time or set up too rapidly. Each of these mixes is preferably made while the material is in a vacuum, or while an exhausting vacuum is being effected, in order that air may be extracted from the material and the resulting mold, model, or the like is as dense as possible and with its surfaces as smooth as possible.

At the same time it is desired that the mixing, frequently referred to as spatulation, be effected as soon after the liquid has been introduced to, or associated with, the powder so that the desired time for working with the mixture is maintained as long as possible.

By the present invention there is provided a power mixer that will operate at the slower speeds generally required with the stone compositions and at the same time may mix at the higher speeds required by the mold forming investment materials.

The principal object of the present invention is, therefore, the provision of a power mixer which may readily, selectively and conveniently be used as a high speed mixer or as a relatively low speed mixer.

Another object of the present invention is the provision of a power mixer that accomplishes the foregoing object and in which the time loss between the association of the liquid and the dry powder is reduced to a minimum before the power mixing operation is initated.

A further object of the present invention is the provision of a power mixer for accomplishing the foregoing objects which is economical to produce and acquire consistent with the work to be accomplished thereby.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 2 is a side elevational view of a power mixer as seen from the right hand side of FIG. 1.

2

Figure 1:
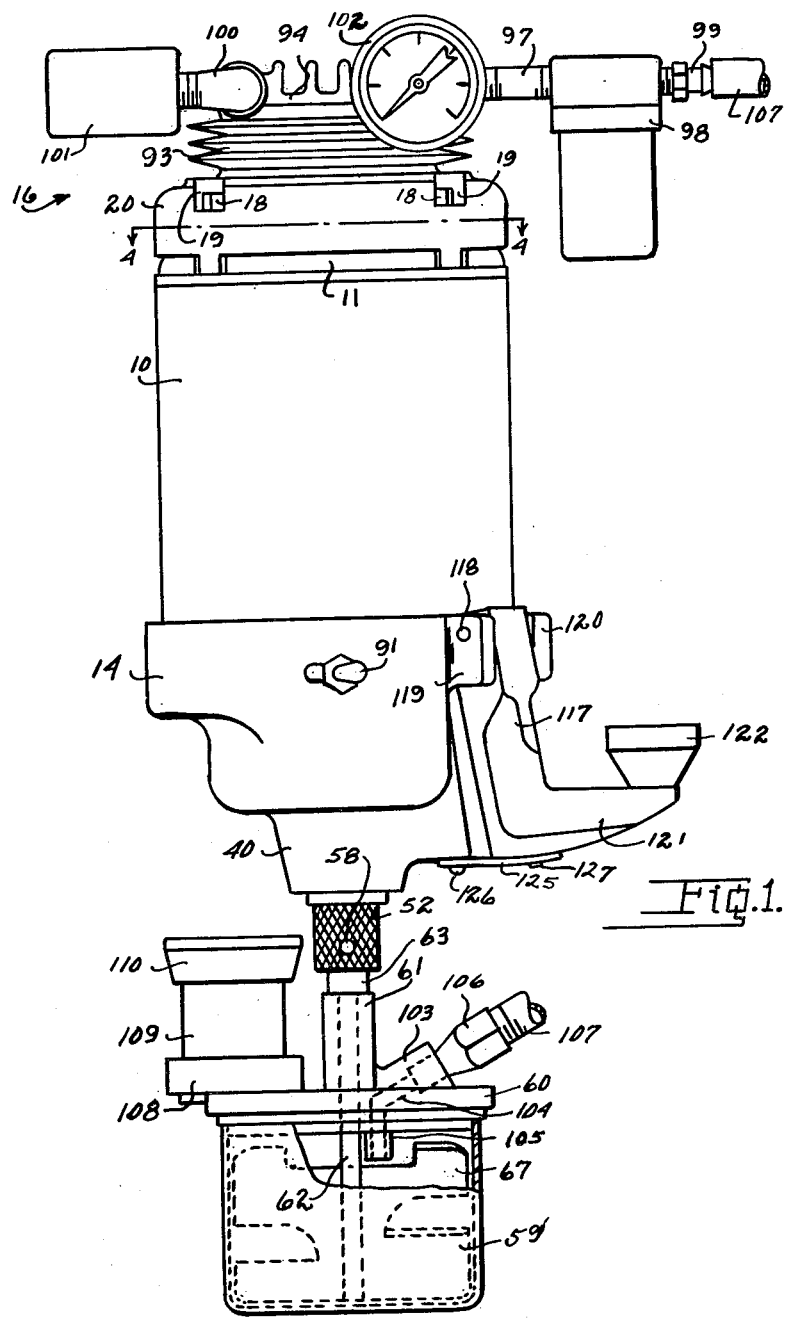
FIG. 1 is a front elevational view of a power mixer embodying the principles and constructions of the present invention.

FIG. 3 is a bottom plan view of the mixer as seen in FIGS. 1 and 2.

FIG. 4 is a view partly in elevation and partly in section as seen from line 4—4 on FIG. 1.

FIG. 5 is a horizontal, sectional view through the lower end of the mixer as seen from line 5—5 on FIG. 2.

FIG. 6 is a vertical, fragmentary, sectional view through a portion of the lower end of the mixer as seen from line 6—6 on FIG. 5.

FIG. 7 is a vertical, fragmentary, sectional view through a portion of the lower end of the mixer taken at right angles to FIG. 6 as seen from line 7—7 on FIG. 5.

FIG. 8 is a horizontal, sectional view through the lower end of FIG. 2 as seen from line 8—8 on said FIG. 2.

FIG. 9 is a fragmentary, sectional view through a portion of the device as seen from line 9—9 on FIG. 5, illustrating a detail of the device.

FIG. 10 is a wiring diagram of the connection of the motor with the control switches to the high speed and relatively low speed driving chucks.

Throughout the several views of the drawings similar reference characters are employed to denote the same or similar parts.

The power mixer of the present invention utilizes an electric motor 10 of appropriate size and horse power and which motor includes the usual end plates 11 and 12. The said end plates 11 and 12 provide the bearings for a double ended motor shaft, one end, indicated by the reference numeral 13, see FIG. 5, is utilized, as will presently be made clear, for driving the driven member of the mixer, per se.

The motor 10 has secured thereto, to form a unitary construction therewith, below its end plate 12, a housing 14 substantially cup shaped and having a hollow interior 15. The motor has connected to its upper end a pump mechanism, specifically a vacuum pump, indicated in its entirety by the reference numeral 16. The motor central or body portion along with its end plates 11 and 12, the housing 14 and the pump mechanism 16 are connected to one another by means of the usual draw bolts 17 each of which is provided with a head 18 seated at the base of a relieved portion 19 in the pump carrier plate 20. The lower ends of the said draw bolts are threaded as at 21, see FIG. 6, and respectively are threadedly engaged in a lug 22 inwardly projecting from the wall 23 of the housing 14 and against which lugs the parts are clamped.

The said motor end plates 11 and 12, as noted above, provide the upper and lower bearings for the motor shaft with said bearings each being encircled by a projecting boss 24 of a convenient diameter, and which bosses are employed in mounting the mixer. Since said bosses and the operation thereof are substantially identical with one another it is deemed sufficient if but one of them is described for the other.

As seen in FIG. 4 the motor upper end plate 11 has its boss 24 encircled by a bracket arm 25 which includes a semi-circular seat 26 and with said bracket arm laterally of its seat 26 having outwardly projecting lugs 27 and 28. Said lugs 27 and 28, respectively, project through an aperture 29 and 30 respectively formed in segmental straps 31 and 32. Said straps 31 and 32 are formed so as between them to form, substantially, a semi-circle and engage the portion of the bearing boss 24 not engaged by the seat 26 and, as seen most clearly in said FIG. 4, said straps 31 and 32 have their free ends formed as outwardly projecting ears, respectively, 33 and 34. The said ears are provided with axially aligned apertures through which projects a clamping bolt 35 having the usual head 36 at one end and engaging the ear 34 and with said bolt 35 having threaded on its other end a nut 37 engaging the strap ear 33.

It is believed obvious from FIG. 4 that by drawing the strap ears 33 and 34 toward one another the bearing boss 24 is forced against the seat 26 and is securely clamped therein by the straps 31 and 32.

A similar bracket arm 25 is respectively at the upper and lower ends of the bracket body portion 38 and which body portion is employed in mounting or securing the motor 10 and parts connected therewith to a suitable support, generally a vertical support.

The housing 14 is provided with a base 39 from which downwardly projects a boss 40 provided, for convenience, with apertures, as at 41 and 42, with each aperture communicating with the interior 15 of the housing 14. The boss aperture 41 is counterbored from each end thereby providing shoulders 43 and 44 against which is pressed, respectively, the outer races 45 and 46 of ball bearings 47 and 48.

The ball bearings 47 and 48 each have their inner races 49 and 50 on a shaft 51 which extends beyond the opposite ends of the housing boss 40. The portion of the shaft projecting below the said boss 40 is enlarged and may be designated as the shaft driving head 52 while the end of the shaft 51 above the boss 40 and therefore within the interior 15 of the housing 14 is reduced as at 53. Secured to the said reduced portion 53 of the shaft 51 is a gear 54 which upon being secured in position to the shaft 51 secures the said shaft 51 against axial movement in the housing boss 40.

The gear 54 is meshed with a pinion 55 secured in any suitable or desirable manner to the reduced portion 56 of the motor shaft lower end 13 and through which pinion motion is imparted to the gear 54 and the shaft 51.

The driving head 52 of the shaft 51 is provided upwardly of its lower end with a socket 57 traversed by a pin 58 and which pin acts as the connecting element or key between the said shaft 51 and the driven element of a separable mixer unit as will presently be made clear.

As seen in the drawings, particularly in FIGS. 1 and 2, the separable mixer unit, per se, not new in the present application, comprises a cuplike receptacle 59 closed by a lid or cover 60. The lid or cover 60 has upstanding therefrom, and substantially centrally thereof, a bearing sleeve 61 in which is journaled a shaft 62. The shaft 62 has threaded thereto an enlarged upper end 63, projecting above the bearing sleeve 61 and which shaft enlargement or head 63 is of a diameter substantially equal to the diameter of the driving head socket 57 and which parts are readily telescoped with respect to one another. The shaft head 63 is further provided with a transverse kerf or slot 64 thereby providing driving fingers 65 and 66.

In operation the shaft head 63 is inserted in the socket 57 and with the driving pin 58 thereof disposed in the slot or kerf 64 with said fingers 65 and 66 respectively on opposite sides of the pin or key 58, thereby providing a keyed or driving connection between the motor unit and mixer unit.

The mixer shaft 62 within the bowl or receptacle 59 has keyed or otherwise connected thereto a mixing blade or paddle 67 to be rotatively driven within the said bowl or container 59 by the said motor shaft.

The mixer unit is held, through its bowl or container, in the hands of the operator in order to operatively associate the mixer shaft and driving shaft socket and upon operative association the motor is automatically switched on. In order to automatically switch on the motor 10 upon insertion of the mixer shaft head 63 into the driving shaft socket 57 the shaft 51 is provided substantially centrally thereof with a bore 68 in which is freely disposed a vertically movable plunger 69. The plunger is provided at its lower end with an enlarged head 70 which normally rests against the shaft driving head pin or key 58 for thereby limiting the downward gravitational movement of said plunger 69.

Inwardly projecting from the wall 23 of the housing 14 at points above the plunger 69 are mounting lugs 71 and 72 which rigidly support a switch carrier or bridge 73.

The said carrier or bridge 73 is preferably made of insulating material and is secured in position by screws 74 passing therethrough into the supporting lugs 71 and 72. The said carrier or bridge 73 has secured to one side thereof a switch 75, designated in the trade as a microswitch. A movable switch member or actuator 76 downwardly projects from the switch 75 and is yieldably biased to a position where said switch is normally open. Carried by the said switch support or bridge 73 is a leaf spring 77 which is of sufficient length to overlie the upper end of the plunger 69 and underlie the switch actuating or operating member 76. Any suitable means may be employed for mounting the said leaf spring on the bridge 73, that shown in the drawings comprising an upstanding mounting finger 78 at one end thereof secured to the bridge 73 by suitable screws 79.

In operation, the mixer shaft driven head 63 is manually shifted from the solid line position thereof in FIG. 6 upwardly and into the socket 57 to the phantom line position. In the movement of the parts to said operative position the upper ends of the finger 65 and 66 engage the plunger head 70 and elevate the same for thereby upwardly axially shifting the plunger 69 through the shaft central bore 68 and at the same time shifting the free end of the leaf spring 77 from its solid line position to its phantom line position, which is, substantially, in engagement with the lower surface of the switch carrier or bridge 73. The positioning of the leaf spring 77 to said phantom line position operates the switch actuator 76 for thereby completing the electric circuit, as will be obvious from FIG. 10, through the motor 10 and effecting its operation.

The mixer, per se, is grasped in the hands of the operator when shifting the same to its operative position, such as illustrated by the phantom lines of the driven head 63 in FIG. 6, and the parts are manually held in these positions until the mixing has been completed whereupon a reverse movement of the mixer, that is, the withdrawal of the mixer shaft head 63 from the socket 57 allows the plunger 69 to drop to its lower position and relieves the pressure from the leaf spring 77 which returns to its normal downward position, the solid line position thereof in FIG. 6, whereupon the switch actuator 76 is yieldably actuated to its normal position for opening the switch 75 and permitting the motor 10 to stop.

The foregoing description is substantially identical with the disclosure in the above noted pending application Serial No. 852,093 and in view of the ratio disclosed in the drawings between the driven gear 54 and motor pinion 55 the shaft 51 will be rotated at a speed somewhat slower than the speed of rotation of the end 13 of the motor shaft.

The said motor pinion 55 is secured to the reduced portion of the motor shaft lower end 13 through a socket 80 upstanding from the said pinion 55 and a pin 81 extending through the said parts. The pinion 55 has projecting from its lower face a shaft or stud 82 received in the central passageway 83 of a sleeve 84. The sleeve 84 is secured to the pinion stud 82 through a screw 85. The sleeve 84 is provided upwardly of its lower end with a counterbore 86 having its lower end formed as a flaring socket 87.

The socket 87 is adapted to be connected with a mixer unit as illustrated in FIG. 2.

The mixer unit illustrated in FIG. 2 is identical with that illustrated in FIG. 1 except that the enlarged upper end or head is not provided with a kerf or slot. Instead, the mixer shaft 62 is provided with an enlarged head such as illustrated in FIG. 6 and which enlarged head may be defined as tapered; said head is identified in FIG. 6 by the reference numeral 88. The said mixer driving head 88 is provided substantially intermediate its ends with a circular projection 89, in practice taking the form of an O ring. The said driving head 88 is particularly illustrated and described in the pending application of Edmund A.

Steinbock, Jr., Serial No. 407,337, filed Feb. 1, 1954 for an Investment Mixer.

It is to be understood that the driving head 88 is threaded onto the mixer shaft 62 in place of the driving head 52 when the mixer is to be connected with the socket 87 instead of with the socket 57.

Obviously, since the sleeve 84 is connected directly with the end 13 of the motor shaft the said sleeve 84 and its socket 87 will be rotated at a higher rate of speed than the shaft 51 and its socket 57.

In operation, therefore, the mixer unit, when supplied with the driving head 88 for connection with the sleeve socket 87 the mixer shaft, will be rotated at a higher rate of speed than would be the case if the said mixer shaft 62 has secured thereto the head 63 for connection with the sleeve-shaft 51.

As noted above, and as will now be obvious, the operator through the same mixer prime mover may select, pending upon the materials being mixed, the necessary or desired speed of mixing.

In operation the mixer with the head 88 attached thereto is utilized in the same manner as above set forth, namely, by grasping the mixer through its bowl or receptacle 59 and inserting the driving head 88 into the socket 87. It should be noted however, that in the use of the head 88 it is inserted in the socket 87 and removed therefrom while the sleeve 84 and its socket 87 are rotating and wherefore the motor 10 is operating prior to the association of the parts instead of starting the operation of the motor 10 after the association of the parts, as above set forth.

In order that the motor 10 may be switched on when a mixer including the head 88 is to be employed there is provided a switch 90 known in the trade as a toggle switch and including a manually operable switch member 91. For convenience the switch 90 is mounted in the housing 14 to have the switch finger 91 outwardly or forwardly project therefrom, preferably, at the front thereof.

As illustrated in the wiring diagram in FIG. 10 both the micro switch 75 and the toggle switch 90 are wired in parallel with one another and between the standard pronged plug 92, for connection with the usual electric current outlet, and the motor 10 as clearly illustrated in the wiring diagram in FIG. 10.

As was noted above, the mixer as herein disclosed has secured to its upper end a vacuum pump and which includes the pump carrier plate 20 to which is secured the pump housing 93. The pump housing 93 has its outer end closed by a closure plate 94 and through which are the air intake and air outlet ports.

The vacuum pump is a well known commercial product and is not further illustrated in the drawings except in FIG. 4 where the pump rotor 95 is illustrated as keyed to the reduced upper end portion 96 of the motor shaft. It is to be understood that the rotor 95 is of the vane type and enclosed within the pump housing 93 for first drawing air from the interior of the mixing bowl and then discharging same to the atmosphere.

As shown in the drawings the intake for the pump has connected therewith one end of a nipple 97 which has its other end connected through an oiler 98 to a hose coupling 99.

The exhaust or outlet port from the vacuum pump is at one end of an elbow 100 which has connected to its other end a filter muffler 101. Also connected with the pump, preferably the intake port thereof is a vacuum gauge 102 for apprising the operator of the proper operation and function of the pump. It should be understood that the oiler 98 is employed merely for convenience and whereby the air automatically picks up a small quantity of oil to maintain the smooth operation of the vanes in the pump rotor. For the same reasons the outlet from the pump has connected therewith the filter muffler so that any excess oil in the pump or air is not discharged into the atmosphere.

In order that the vacuum pump may be connected with the mixer unit the cover or lid 60 of said mixer unit has on its upper surface laterally of the bearing sleeve 61 a lug 103 provided with a passageway 104 communicating with a sleeve 105 which through the cover 60 communicates with the interior of the bowl or receptacle 59.

The lug 103 is counterbored to have inserted therein a reduced portion of a hose coupling 106 and which hose coupling has secured thereto in any suitable or desirable manner one end of a flexible hose 107. The said hose 107 has its other end connected with the hose coupling 99 from the vacuum pump inlet, as above pointed out.

The material being mixed in the bowl or container 59, particularly in the formation of a casting mold, is adapted to be discharged from the said bowl or container 59 directly into a mold former or flask and preferably while the negative pressure or vacuum is in operation.

Accordingly the said mixer unit lid or cover 60 is provided laterally of its bearing sleeve 61 with a counterbored lug or boss 108 receiving the lower end of the mold former or flask 109. The said mold former or flask is generally a sleevelike member wherefore the boss 108 is generally formed circular in plan and similarly circularly counterbored for the flask or sleeve 109. The upper end, as seen in FIG. 1, of the mold former sleeve or flask 109 is closed by a member 110, designated in the trade as a crucible former and sprue former pin carrier.

In the formation of a mold, the sprue former pin has secured to its inner or free end the wax pattern located within the crucible former sleeve or flask 109, so as to be encased by the cementitious mold material as it is discharged from the bowl or container 59.

As is well known, the wax patterns, particularly those used for dental restorations, are frequently provided with undercuts and thin edges and to be certain of the cementitious material fully filling said undercuts and thin edges the mold former is vibrated during the discharge thereinto of the cementitious mold forming material, and thereby further insuring the solid packing of said mold material within the mold former sleeve or flask 109.

Accordingly, the device of the present invention and as herein disclosed is provided with such a vibrator and for which purpose use is made of the driven sleeve 84. The said sleeve 84 is provided immediately beneath the motor pinion 55 with a reduced portion 111 which, see FIG. 8, is provided on opposite sides thereof with flats 112 and 113 acting as vibrating cams, as will presently be made clear.

Radially outwardly of the said reduced portion 111 of the driven sleeve 84 the housing 14 is provided with an aperture 114 through which extends a circular rod 115. The rod 115 has its outer end adjacent to and adapted to be engaged by the rear vertical face 116 of a lever 117. The lever 117 is pivotally mounted through a pin 118 between opposed ears 119 and 120 outwardly projecting from the housing 14. The lever 117 is substantially L shaped and provided with a relatively horizontally extending portion 121 to the outer end of which is secured a support or platform 122, preferably formed of rubber for an obvious reason subsequently to be made clear.

The lever 117, see FIG. 9, below its pivot pin 118 is provided with a socket 123 into which is disposed a spring 124 having its one end on the socket bottom and its other end against the outer face of the housing 14.

In practice the parts bear relation to one another such that the spring 124 is always under tension for outwardly urging the lever 117 for thereby permitting the rod 115 to be normally quiet and free of the reduced portion 111 and the vibrating cams 112 and 113 of the driven sleeve 84. The said movement of the lever 117 by the spring 124 is limited by a latch 125 secured by a screw 126 to the base or bottom of the housing 14. The latch 125 extends beneath the lever horizontal arm 121 and is provided with a elongated aperture 127 into which projects a pin 128 outwardly projecting from the said lever horizontal portion 121.

It is believed obvious that the movement of the lever 117 in a clockwise or outward direction by the spring 124 will be limited upon the engagement of the pin 128 with the outer end of the elongated slot 127 in the latch 125.

In view of the foregoing it is believed that the operation of the power mixer of the present invention is obvious since the rotation of the motor by either the micro switch 75 or the toggle switch 90 will operate the vacuum pump and, assuming the connection of the hose 107 between the vacuum pump and mixer unit, the mixer bowl or container 59 and the mold forming sleeve or flask 109 are evacuated during the mixing of the ingredients within the said bowl or container 59. Upon the completion of the mixing operation and the separation of the mixer unit from the motor unit but without disconnecting the vacuum pump from the mixing unit the said mixing unit is rotated, inverted, to downwardly dispose the flask 109 whereupon the crucible former and sprue former pin carrier are engaged with the platform 122 and sufficient pressure applied to the mixer unit for actuating the lever 117 in a counter clockwise or downward direction to engage the rod 115 with the driven sleeve reduced portion 111 and its vibrating cam faces 112 and 113 to cause a vibration or rapid "short stroke" vertical movement of the platform 122 and the mixer unit, at this time resting thereon. This vibration effects a tamping or packing of the investment material within the mold forming housing or sleeve 109.

Upon the filling of the flask 109 the mixing unit is removed from the platform 122 and the spring 120 returns the lever 117 to its normal position thereby permitting the rod 115 to be clear of the vibrating cams 112 and 113. At this time the hose 107 is removed through its coupling 106 from the mixing unit and the mold forming ring, sleeve or flask 109, disconnected from the mixer unit for permitting the cementitious material therein to dry out, set and harden for subsequent use.

From the foregoing it is believed now evident that there has been provided a power mixer which accomplishes the objects initially set forth and in which, particularly, the user has a choice of mixing speeds depending upon the particular materials being mixed.

What is claimed is:

1. In a mixer of the class described the combination of a motor including a shaft having one end projecting from the motor, a housing, having a hollow interior, carried by the motor at one end and into which the motor shaft end projects, a shaft carried by said housing and having one end thereof projecting into the interior of the housing and the other end projecting beyond the housing, means interiorly of the housing connecting the housing supported shaft with the motor shaft so that said housing supported shaft is rotated at a lesser speed than the speed of the motor shaft, said housing supported shaft outwardly of the housing having formed therein a driving socket, a sleeve secured to said motor shaft to project outwardly of the housing and said projecting sleeve portion having formed therein a driving socket, a mixer unit including a rotatable mixer shaft having one end projecting from the mixer unit, selectable driven means associable with the projecting end of the mixer shaft for selectable connection with the housing supported shaft socket or the motor supported sleeve socket, said housing supported shaft socket having a pin extending transversely thereof, said motor mounted sleeve socket having inwardly tapered walls, said selectable driven means each being in the form of a head with one of said heads having formed therein a transverse kerf for receiving the driving socket transverse pin and the other of said heads having formed intermediate its ends an outward projection for engaging the tapered wall of the other socket, a pair of normally open control switches within said housing for the motor, a manually operable control member exteriorly of said housing for operating the first of said switches, an actuator within the housing for operating the second of said switches, said driven shaft having a bore axially thereof with said second switch actuator in alignment therewith, and a vertically reciprocal plunger in said driving shaft bore in alignment with the switch actuator, normally inoperatively positioned except when the transverse pin and kerf are operatively associated, whereupon said plunger is vertically reciprocated after the operative connection of the transverse pin and kerf for closing the switch and effecting the motor operation.

2. In a mixer of the class described comprising a motor including a shaft, a hollow housing at one end of the motor into which projects one end of the motor shaft, a driven shaft rotatably supported by the housing to have one end thereof within the interior of the housing and the other end exteriorly of the housing, motion transmitting means between the motor shaft and driven shaft whereby said driven shaft is rotated at a lesser speed than the motor shaft, a socket secured to said motor shaft to be exteriorly of the housing with said socket including inwardly tapered walls, said driven shaft having its exterior end formed as a socket, a pin transversely of said driven shaft socket, a mixer including a container for materials to be mixed and provided with a cover having journaled therein a mixer shaft which projects upwardly of the mixer, a pair of selectable driven heads for said mixer shaft, one of said heads being kerfed to enter the driven shaft socket for driving engagement with its transverse pin and the other of said heads being tapered to enter the motor shaft socket for engagement with its inwardly tapered wall, said mixer further including a removable mold forming flask carried by the cover and communicating with the mixer, an arm pivotally mounted on the housing adapted to have the mold forming flask associated therewith when transferring the material from the container to said flask, normally inoperative means operable by the motor shaft for vibrating the arm, and means operable upon the association of the mold forming flask and pivotally mounted arm for activating the arm vibrating means.

3. In a mixer of the class described comprising a motor including a shaft, a hollow housing at one end of the motor into which projects one end of the motor shaft, a driven shaft rotatably supported by the housing to have one end thereof within the interior of the housing and the other end exteriorly of the housing, motion transmitting means between the motor shaft and driven shaft whereby said driven shaft is rotated at a lesser speed than the motor shaft, a socket secured to said motor shaft to be exteriorly of the housing with said socket including inwardly tapered walls, said driven shaft having its exterior end formed as a socket, a pin transversely of said driven shaft socket, a mixer including a container for materials to be mixed and provided with a cover having journaled therein a mixer shaft which projects upwardly of the mixer, a pair of selectable driven heads for said mixer shaft, one of said heads being kerfed to enter the driven shaft socket for driving engagement with its transverse pin and the other of said heads being tapered to enter the motor shaft socket for engagement with its inwardly tapered wall, automatic control means for the motor operable by one of said heads upon association with its driving socket, a manually operable control means for said motor operable prior to the association of the second of said heads with its driving socket, said mixer further including a removable mold forming flask carried by the cover and communicating with the mixer, an arm pivotally mounted on the housing adapted to have the mold forming flask associated therewith when transferring the material from the container to said flask, normally inoperative means operable by the motor shaft for vibrating the arm, and means operable upon the association of the mold forming flask and pivotally mounted arm for activating the arm vibrating means.

4. In a mixer of the class described comprising a motor including a shaft, a hollow housing at one end of the motor into which projects one end of the motor shaft, a driven shaft rotatably supported by the housing to have one end thereof within the interior of the housing and the other end exteriorly of the housing, motion transmitting means between the motor shaft and driven shaft whereby said driven shaft is rotated at a lesser speed than the motor shaft, a socket secured to said motor shaft to be exteriorly of the housing with said socket including inwardly tapered walls, said driven shaft having its exterior end formed as a socket, a pin transversely of said driven shaft socket, a mixer including a container for materials to be mixed and provided with a cover having journaled therein a mixer shaft which projects upwardly of the mixer, a pair of selectable driven heads for said mixer shaft, one of said heads being kerfed to enter the driven shaft socket for driving engagement with its transverse pin and the other of said heads being tapered to enter the motor shaft socket for engagement with its inwardly tapered wall, a pair of normally open control switches for said motor within the housing, a manually operable control member externally of said housing for the first of said switches, an actuator within the housing for the second of said switches, said driven shaft having a bore axially thereof with said second switch actuator in alignment therewith, a vertically reciprocal plunger in said driving shaft bore in alignment with the switch actuator normally inoperatively positioned except when the transverse pin and kerf are operatively associated whereupon said plunger is vertically reciprocated after the operative connection of said transverse pin and kerf for closing the switch and effecting the motor operation, said mixer including a removable mold forming flask carried by the cover and communicating with the mixer, an arm pivotally mounted on the housing adapted to have the mold forming flask associated therewith when transferring the material from the container to said flask, normally inoperative means operable by the motor shaft for vibrating the arm, and means operable upon the association of the mold forming flask and pivotally mounted arm for activating the arm vibrating means.

5. In a mixer of the class described comprising a motor including a shaft, a hollow housing at one end of the motor into which projects one end of the motor shaft, a driven shaft rotatably supported by the housing to have one end thereof within the interior of the housing and the other end exteriorly of the housing, motion transmitting means between the motor shaft and driven shaft whereby said driven shaft is rotated at a lesser speed than the motor shaft, a socket secured to said motor shaft to be exteriorly of the housing with said socket including inwardly tapered walls, said driven shaft having its exterior end formed as a socket, a pin transversely of said driven shaft socket, a mixer including a container for materials to be mixed and provided with a cover having journaled therein a mixer shaft which projects upwardly of the mixer, a pair of selectable driven heads for said mixer shaft, one of said heads being kerfed to enter the driven shaft socket for driving engagement with its transverse pin and the other of said heads being tapered to enter the motor shaft socket for engagement with its inwardly tapered wall, a pair of normally open control switches for said motor within the housing, a manually operable control member externally of said housing for the first of said switches, an actuator within the housing for the second of said switches, said driven shaft having a bore axially thereof with said second switch actuator in alignment therewith, a vertically reciprocal plunger in said driving shaft bore in alignment with the switch actuator normally inoperatively positioned except when the transverse pin and kerf are operatively associated whereupon said plunger is vertically reciprocated after the operative connection of said transverse pin and kerf for closing the switch and effecting the motor operation, spring means tensioned by said plunger upon the closing of the switch and operable to return the plunger to its normal inoperative position, said mixer including a removable mold forming flask carried by the cover and communicating with the mixer, an arm pivotally mounted on the housing adapted to have the mold forming flask associated therewith when transferring the material from the container to said flask, normally inoperative means operable by the motor shaft for vibrating the arm, and means operable upon the association of the mold forming flask and pivotally mounted arm for activating the arm vibrating means.

6. In a mixer of the class described comprising a motor including a shaft, a hollow housing at one end of the motor into which projects one end of the motor shaft, a driven shaft rotatably supported by the housing to have one end thereof within the interior of the housing and the other end exteriorly of the housing, motion transmitting means between the motor shaft and driven shaft whereby said driven shaft is rotated at a lesser speed than the motor shaft, a socket secured to said motor shaft to be exteriorly of the housing with said socket including inwardly tapered walls, said driven shaft having its exterior end formed as a socket, a pin transversely of said driven shaft socket, a mixer including a container for materials to be mixed and provided with a cover having journaled therein a mixer shaft which projects upwardly of the mixer, a pair of selectable driven heads for said mixer shaft, one of said heads being kerfed to enter the driven shaft socket for driving engagement with its transverse pin and the other of said heads being tapered to enter the motor shaft socket for engagement with its inwardly tapered wall, said mixer including a removable mold forming flask carried by the cover and communicating with the mixer, an arm pivotally mounted on the housing adapted to have the mold forming flask associated therewith when transferring the material from the container to said flask, normally inoperative means operable by the motor shaft for vibrating the arm, means operable upon the association of the mold forming flask and pivotally mounted arm for activating the arm vibrating means, a vacuum pump carried by the other end of the motor operated by the motor shaft, and means connecting said vacuum pump and mixer container.

References Cited in the file of this patent
UNITED STATES PATENTS

| | | |
|---|---|---|
| 1,703,099 | Craddock | Feb. 26, 1929 |
| 1,847,227 | Ringwald | Mar. 1, 1932 |
| 2,524,425 | Chester | Oct. 3, 1950 |
| 2,777,177 | Steinbock | Jan. 15, 1957 |
| 2,821,905 | Culligan | Feb. 4, 1958 |